Patented June 24, 1952

2,601,335

UNITED STATES PATENT OFFICE 2,601,335

DEXTRINIZATION OF SORGHUM FLOUR

Richard L. Slotter, Minneapolis, Minn., assignor to Archer-Daniels-Midland Company, Minneapolis, Minn., a corporation of Delaware No Drawing. Application December 4, 1950, Serial No. 199,155

4 Claims. (Cl. 127—38)

The present invention relates to starch modifiers for gypsum board plaster and more particularly to a starch modifier prepared from grain sorghum flours.

In the making of gypsum board, it is customary to prepare a gypsum mixture of calcined gypsum and water, known in the trade as gypsum board plaster or "stucco," which is produced by mixing calcined gypsum and water in appropriate proportions so as to give a workable plaster or "stucco" that is applied as a core between the paper sheets in the formation of the plaster board. In accordance with this invention, it has been discovered that adhesion of the paper sheets on the exterior of gypsum board to the gypsum core is enhanced by adding to the mixture of gypsum and water used for preparing the gypsum plaster or "stucco," a relatively small percentage of grain sorghum flour which is partially dextrinized.

In accordance with my invention grain sorghum flour is partially dextrinized by treating it with a solution of ¼% to 1½% by weight, dry basis, of hydrochloric acid, said solution being preferably added to the dry flour by spraying thereon a solution of hydrochloric acid, the amount of water in said solution being such that the flour when treated with acid contains 15–25% moisture after being sprayed. After the solution of acid is applied to the flour, preferably by spraying thereon as aforesaid, the flour is passed through a ventilated heating chamber. The mixture of flour and acidulated water contains about ¼ to 1¼% acid (dry basis), 10% to 25% water and the balance flour. Physically it has the appearance of the original grain sorghum flour. Other inexpensive organic or inorganic acids capable of establishing substantially the same acidity of the mix may be substituted.

The flour is preferably sprayed with said acid solution as a continuous process. After the aqueous acid solution is applied to the flour, preferably by spraying thereon as the flour moves as a continuous flow, the mixture is passed through a hammer mill in order intimately to disperse the aqueous acid solution upon the particles of sorghum flour. By this means the mixture is made ready continuously and immediately for the subsequent step of partial dextrinization. By passing the mixture through the hammer mill it is possible very quickly and continuously to obtain intimate mixture of the products thereby to maintain uniformity of dextrinization and to maintain the quality of the product constant.

The flour thus moistened with acid solution and hammer milled is then passed as a continuous flow through a ventilated heating chamber, such as a steam jacketed kettle, provided with a screw or paddle blading for agitating the mixture while moving it through the heated chamber. The rate of flow of the acid treated flour through the ventilated heated chamber and the heat supplied to the heating chamber are regulated so that the mixture of flour and acidulated water is heated to a temperature in the range of 215° F. to 300° F. and is maintained at such temperature for a period of ten to forty minutes.

During the passage of the mixture through the ventilated heated chamber, which may be indirectly heated by process steam, the flour is partially dextrinized and the moisture component of the mixture is simultaneously reduced to 3–10%. After having passed through the heating chamber, the grain sorghum flour will be 20–90% soluble due to the partial dextrinization of the flour thereby accomplished. So far as physical appearance is concerned, the finished product is simply a flour, having substantially the same appearance as the starting material flour.

The solubility of the dextrinized grain sorghum flour produced as above stated is determined by taking a weighed sample of the treated flour and mixing it in approximately ten times the weight of the sample in water. The mixture is thoroughly stirred and allowed to set from two to twenty-four hours and the supernatant liquor is then decanted off and evaporated. The dry residue remaining after the supernatant liquor is evaporated off is the material taken into solution (hence soluble materials) and this weight is used as the basis of calculating the percentage of soluble factors in the dextrinized grain sorghum flour as stated herein. It may be explained that by permitting the mixture to stand for, for example, twenty-four hours, as compared to two hours, approximately 2% to 3% greater solubility is obtained. It is to be understood, however, that such variations are within the range of experimental error for the percentage solubles herein stated.

The flour throughout the process even when moistened and hammer milled and after leaving the dextrinization chamber has no visually different physical appearance than the original flour being free-flowing and finely-divided, capable of being bagged and sacked and readily shipped in commerce. The final product is free flowing, readily wettable and has a moisture content of 3% to 12%.

In utilizing the thus treated flour, it is added to the gypsum during the preparation of the gypsum plaster or "stucco," as the plaster is sometimes designated in the trade. Addition of the treated flour to the gypsum stucco mixture may be accomplished at any time after calcining of the gypsum up to the time that the finished stucco is made and just prior to being utilized on the gypsum board machine. It is a feature of the present invention that the partially dextrinized sorghum flour may thus be utilized at any time, and when so utilized accomplishes its intended purpose fully and completely.

To the gypsum stucco there is added sufficient partially dextrinized grain sorghum flour so that it is present in the finished stucco in an amount equal to ½% to 3% dry basis of the ingredients of such stucco.

The partially dextrinized grain sorghum flour of the present invention has the property of taking up (absorbing) 2½ to 5 times its own weight in water. Accordingly, in the preparation of the gypsum board "stucco," no substantial variation in the gypsum formula (ratio of calcined gypsum to water) need be made in order to provide the requisite moisture for the added dextrinized grain sorghum flour, since only ½% to 3% of the flour is added.

Upon addition of the dextrinized grain sorghum flour to the stucco there is provided a smooth flowing stucco condition which greatly enhances the adhesion of the paper to the set stucco core during the formation of the gypsum board, sometimes called plaster board. The grain sorghum flour component appears to migrate to the surface of the stucco core and by this action enhances the adhesion of the paper to the core. Available evidence also seems to indicate that the partially dextrinized grain sorghum flour also influences the rate of crystallization of the gypsum during the hardening of the board and which in turn governs the size of the gypsum crystals and aids adhesion between the hardened gypsum core and the overlying paper exterior layer.

As many apparently widely different embodiments of this invention may be made without departing from the spirit and scope thereof, it is to be understood that I do not limit myself to the specific embodiments herein.

What I claim is:

1. A method of producing a modifier for gypsum board plaster which comprises treating grain sorghum flour with ¼% to 1½% by weight, dry basis, of acid, said acid being dissolved in sufficient water so that the flour when treated with acid solution contains 10% to 25% of water, passing the mixture as a continuous flow through a hammer mill and then through a ventilated chamber which is heated sufficiently to elevate the temperature of the mixture to 215° F. to 300° F. for a period of ten to forty minutes so as partially to dextrinize said flour, said flour being simultaneously dried in said ventilated chamber to a moisture content of 3% to 12%.

2. A method of producing a modifier for gypsum board plaster which comprises treating grain sorghum flour with ¼% to 1½% by weight, dry basis, of hydrochloric acid, said acid being dissolved in sufficient water so that the flour when treated with acid solution contains 10% to 25% of water, passing the mixture as a continuous flow through a hammer mill and then through a ventilated chamber which is heated sufficiently to elevate the temperature of the mixture to 215° F. to 300° F. for a period of ten to forty minutes so as partially to dextrinize said flour, said flour being simultaneously dried in said ventilated chamber to a moisture content of 3% to 12%.

3. The method of producing partially dextrinized grain sorghum flour for use in gypsum board plaster, which comprises passing a continuous flow of grain sorghum flour along a course of travel, depositing on said flour an aqueous solution of hydrochloric acid in an amount to form a mixture of flour, water and acid containing 10% to 25% water, ¼% to 1½% hydrochloric acid by weight, dry basis, and the balance grain sorghum flour, passing the mixture through a hammer mill and then passing the mixture through a steam-jacketed chamber as a continuous flow while simultaneously ventilating said chamber and agitating the mixture therein, said mixture being passed through such chamber at a rate such that it is heated to a temperature of 215° F. to 300° F. for a period sufficient to render the resultant product emanating from said heating chamber 20% to 90% soluble in water, said product being simultaneously dried in said chamber to a moisture content of 3% to 12%.

4. A continuous method of producing a starch modifier for gypsum plaster which comprises moving a stream of grain sorghum flour and simultaneously spraying thereon an aqueous solution of hydrochloric acid in an amount sufficient to render a final mixture containing 10% to 25% water, ¼% to 1½% of hydrochloric acid, dry basis, and the balance flour, passing the mixture of flour, acid and water through a hammer mill in order intimately to disperse the acidulated water on the solid particles of flour, continuing the flow of said mixture from the hammer mill through a ventilated heated chamber, said flow being timed so that the mixture is heated to a temperature of 215° F. to 300° F. for a period of 10 to 40 minutes and simultaneously dried in this chamber to a moisture content of 3% to 12%.

RICHARD L. SLOTTER.

REFERENCES CITED

The following references are of record in the file of this patent:

UNITED STATES PATENTS

| Number | Name | Date |
|---|---|---|
| 1,956,064 | Edson | Apr. 24, 1934 |
| 2,014,799 | Fuller | Sept. 17, 1935 |
| 2,126,520 | Wakeman | Aug. 9, 1938 |
| 2,274,789 | Horesi | Mar. 3, 1942 |
| 2,508,359 | Baker | May 23, 1950 |